United States Patent
Bicer et al.

(10) Patent No.: US 9,495,585 B2
(45) Date of Patent: Nov. 15, 2016

(54) POSE DETERMINATION FROM A PATTERN OF FOUR LEDS

(71) Applicant: ASELSAN ELEKTRONIK SANAYI VE TICARET ANONIM SIRKETI, Ankara (TR)

(72) Inventors: Kadir Hakan Bicer, Ankara (TR); Erkan Okuyan, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 14/898,108

(22) PCT Filed: Jun. 11, 2013

(86) PCT No.: PCT/IB2013/054769
§ 371 (c)(1),
(2) Date: Dec. 11, 2015

(87) PCT Pub. No.: WO2014/199196
PCT Pub. Date: Dec. 18, 2014

(65) Prior Publication Data
US 2016/0148045 A1    May 26, 2016

(51) Int. Cl.
*H04N 5/225* (2006.01)
*H04N 5/228* (2006.01)
(Continued)

(52) U.S. Cl.
CPC ......... *G06K 9/00375* (2013.01); *G06K 9/2027* (2013.01); *G06K 9/2054* (2013.01); *G06T 7/0042* (2013.01); *G06T 7/2033* (2013.01);
(Continued)

(58) Field of Classification Search
CPC .......... G06K 9/00375; G06K 9/2027; G06K 9/2054; G06T 2207/10048; G06T 2207/30204; G06T 2207/30208; G06T 7/0042; G06T 7/2033; H04N 5/2256; H04N 5/2354
See application file for complete search history.

(56) References Cited

U.S. PATENT DOCUMENTS 5,227,985 A * 7/1993 DeMenthon ............ G01S 5/163
                                                       345/158
5,828,770 A    10/1998 Leis et al.
(Continued)

OTHER PUBLICATIONS

Boschetti G et al: "A haptic system for robotic assisted spine surgery", Control Applications, 2005. CCA 2005. Proceedings of 2005 IEEE Confere NCE on Toronto, Canada Aug. 29-31, 2005, Piscataway, NJ, USA, IEEE, (Aug. 29, 2005), pp. 19-24.
(Continued)

*Primary Examiner* — Trung Diep
(74) *Attorney, Agent, or Firm* — Gokalp Bayramoglu (57) ABSTRACT

The present invention relates to the field of computation and covers methods to find one to one mapping between fiducial markers on a tracked object and fiducial marker projections on the image plane captured by a camera in optical object tracking systems. A method for solving correspondence problem is realized to find correspondences between 3D points of an object and 2D projection of that object onto the image plane so that this can be used to find the object's 3D location and orientation. It is designed to work without current pose of the tracked object thus it is equally efficient on initial correspondence problem as correspondence problem. Furthermore, a method for selecting LED groups to be used for solving correspondence problem is also presented, which uses pose data representing possible poses of tracked object under working conditions thus LEDS groups are selected to satisfy use case requirements.

15 Claims, 5 Drawing Sheets

(51) Int. Cl.
  *H04N 5/222* (2006.01)
  *G06K 9/00* (2006.01)
  *G06T 7/00* (2006.01)
  *G06K 9/20* (2006.01)
  *G06T 7/20* (2006.01)
  *H04N 5/235* (2006.01)

(52) U.S. Cl.
  CPC .......... *H04N 5/2256* (2013.01); *H04N 5/2354* (2013.01); *G06T 2207/10048* (2013.01); *G06T 2207/30204* (2013.01); *G06T 2207/30208* (2013.01)

(56) References Cited

U.S. PATENT DOCUMENTS 6,330,356 B1* 12/2001 Sundareswaran ......... G06T 3/00 345/648
8,600,166 B2* 12/2013 Adhikari ................. G06F 3/017 382/190
2007/0265105 A1* 11/2007 Barton ............... A63B 24/0003 473/220
2008/0013184 A1* 1/2008 Swope ................. G02B 27/017 359/630

OTHER PUBLICATIONS

Paolo Dario et al: "A Novel Mechatronic Tool for Computer-Assisted Arthroscopy", IEEE Transactions on Information Technology in Biomedicine, IEEE Service Center, Los Alamitos, CA, US, vol. 4, No. 1, (Mar. 1, 2000), pp. 21-24.

Hoff W et al: "Analysis of Head Pose Accuracy in Augmented Reality", IEEE Transactions on Visualization and Computer Graphics, IEEE Service Center, Los Alamitos, CA, US, vol. 6, No. 4, (Oct. 1, 2000), pp. 319-334.

* cited by examiner

POSE DETERMINATION FROM A PATTERN OF FOUR LEDS

FIELD OF THE INVENTION

The present invention relates to the field of computation and covers methods to find one-to-one mapping between fiducial markers on a tracked object and fiducial marker projections on the image plane captured by a camera in optical object tracking systems.

BACKGROUND OF THE INVENTION

It is known that there are methods and models to track a three dimensional object in an environment and compute its position and orientation (pose) with respect to a predetermined coordinate system. These kinds of tracker systems are used, for example, in aircrafts to determine the orientation of a pilot's head. Once the orientation is acquired with respect to the coordinate system of a display devices, for example, then it is possible to generate graphics on these accordingly. There are different methods of tracking an object in a scene using magnetic, mechanical, or optical means. Currently, the spatial relations of objects may also be determined using magnetic sensors or laser beams, but this invention relates specifically to systems using camera-based (day-tv, thermal, IR, Time of Flight, etc.) trackers.

In one of the optical camera-based systems, the pilot wears a helmet with patterns (fiducial markers) and at least one tracker camera determines the helmet's position and orientation using geometric calculations based on these patterns. The patterns used in camera-based tracker systems are either graphical (generally black and white) patterns (passive marker) tracked by visible light cameras or arrays of light sources (e.g., light emitting diodes or LEDs) (active marker). These light sources can be chosen to be in the infrared range of the electromagnetic spectrum with suitable selection of camera sensor and filter set. Other arrangements are also possible but the most convenient among them is the one with the infrared LEDs since these systems can work in poor lighting conditions. Computing spatial relation between an object having a tracking pattern and a camera is, therefore, well known in the state of the art. Throughout the document, whenever a spatial relation is mentioned, it should be understood that the relation in question is between an entity's predetermined reference system with respect to the other's. The objective is to find rotation and translation between camera and 3D object so that the object's 3D location and orientation is known. This reference system is generally based on the respective pattern of an object under consideration. Since the position and orientation of the tracker camera with respect to the other coordinate systems is known (or can be calculated or measured) in a tracker system, it is also possible to compute the helmet's spatial relation with the tracker camera's sensor and then with other coordinate systems. In this context, "tracked object" means an object having a tracking pattern (fiducial marker) and being tracked by a tracker system. It may be either a helmet as in a helmet-mounted tracker system or any other object.

A pose estimation problem for said optical camera-based tracking systems can be stated as follows: Given a set of N feature correspondences between three-dimensional (3D) points of an object and two-dimensional (2D) projection of that object onto the image plane, find the rotation and translation of the object with respect to the reference system of the camera. The objective is to find rotation and translation between camera and 3D object so that the object's 3D location and orientation is known. Pose estimation problem requires correct solution to the correspondence problem. A correspondence problem can be stated as follows: A given (or not-given) rotation and translation of the object with respect to the reference system of the camera, find the N feature correspondences between 3D points of an object and 2D projection of that object on the image plane. The objective is to find correspondences between 3D points of an object and 2D projection of that object on the image plane so that this can be used to find the object's 3D location and orientation. This problem is also well known in the state of the art. However, we have two problems which each require a solution to the other problem to be correctly solvable. Thus, a tracker system requires an initial solution to the either pose estimation problem or the correspondence problem.

A correspondence problem is called an initial correspondence problem if rotation and translation of the object with respect to the reference system of the camera is not given. If one opts to solve the initial correspondence problem, then he/she also makes the completion time for solving correspondence problem as short as possible. Such an effort is necessary since it is possible that a tracked object may leave the view frustum of the camera then return to view. In such cases, restarting of the tracking process is necessary, thus solving the initial correspondence problem quickly and shortening the startup time. In one of the preferred applications, for helmet tracking, a fast startup time significantly reduces blind time, especially if a pilot's head leaves the cameras view frustum many times.

There are some methods currently used to determine initial correspondences between 3D points of the tracked object and 2D projection of that object on the image plane. In one of the methods, a number of consecutive images are used where a number of lit LEDs increase by one at each iteration. Then with proximity calculations, 3D to 2D matching is calculated with the assumption that pose change won't be that great between consecutive captured frames. A newly lit LED will be the one that has not matched to any 2D point, which is then added to the matched list. Solving a correspondence problem is easier where the pose of the tracked object is known with small error. Then similar proximity calculations can be carried out to find 3D to 2D matching.

Solving initial correspondence problems with the current methods require many frame captures, thus it requires a long time, whereas usage of methods that use pose of the tracked object can't be used since rotation/translation data of tracked object is not initially available. The current methods do not offer an effective way of solving the initial correspondence problem. To provide a solution to this problem, a new methodology should be introduced which solves the problem in a very efficient way. Furthermore, the proposed method can be used to solve the correspondence problem (not only the initial case) thus offering an all-around solution to the correspondence problem.

With the proposed method, all the LEDs used for pose determination can be identified. And also the proposed method comprises a series of steps regarding how to select an LED group to be used for solving correspondence problem between the LED group's 3D location and the LED group's respective 2D projections.

The United States patent document US005828770A (Lets, Ristau), an application in the state of the art, discloses a method based on proximity calculations which uses a number of consecutive frame captures to solve the initial correspondence problem. In the same document, a similar proximity based method solves the correspondence problem when the pose of the tracked object is known is also presented.

Boschetti et al., 2005, deals with the problem of guiding an operator during the execution of a 5 degrees of freedom surgical teleoperation task. The work is focused on the feasibility of a spine surgery telerobotic system, made up of a haptic master, a slave robot, an optical tracking device and a main control unit. With this system, the surgeon performs a drilling operation by using a telerobotic device, being guided by haptic feedback: as soon as the vertebra moves, the tracking device measures vertebra pose and a proper force is exerted on the operator's hand to let him/her adjust surgical tool position and orientation. Moreover, the haptic master produces force feedback related to the teleoperation. The paper is focused on the design and implementation of this haptic system, with particular reference to control system architecture.

Dario et al., 2000 Describes a mechatronic tool for arthroscopy, which is both a smart tool for traditional arthroscopy and the main component of a system for computer-assisted arthroscopy. The mechatronic arthroscope, which has a cable-actuated servomotor-driven multi-joint mechanical structure, is equipped with a position sensor for measuring the orientation of the tip and a force sensor for detecting possible contact with delicate tissues in the knee and incorporates an embedded microcontroller for sensor signal processing, motor driving, and interfacing with the surgeon and/or the system control unit. The computer-assisted arthroscopy system comprises an image processing module for the segmentation and 3D reconstruction of pre-operative CT or MR images, a registration module for measuring the position of the knee joint, tracking the trajectory of the operating tools and matching pre-operative and intra-operative images, and a human-machine interface that displays the enhanced reality scenario and data from the mechatronic arthroscope in a friendly and intuitive manner. By integrating pre-operative and intra-operative images and information provided by the mechatronic arthroscope, the system allows virtual navigation in the knee joint during the planning phase and computer guidance by augmented reality during the intervention. This paper describes in detail the characteristics of the mechatronic arthroscope and of the system for computer-assisted arthroscopy and discusses experimental results obtained with a preliminary version of the tool and of the system.

Hoff/Vincent, 2000, discloses a method developed to analyze the accuracy of the relative head-to-object position and orientation (pose) in augmented reality systems with head-mounted displays. From probabilistic estimates of the errors in optical tracking sensors, the uncertainty in head-to-object pose can be computed in the form of a covariance matrix. The positional uncertainty can be visualized as a 3D ellipsoid. One useful benefit of having an explicit representation of uncertainty is that we can fuse sensor data from a combination of fixed and head-mounted sensors in order to improve the overall registration accuracy. The method was applied to the analysis of an experimental augmented reality system, incorporating an optical see-through head-mounted display, a head-mounted charge-coupled device (CCD) camera, and a fixed optical tracking sensor. The uncertainty of the pose of a movable object with respect to the head-mounted display was analyzed.

SUMMARY OF THE INVENTION

An objective of the present invention is to find one-to-one mapping between fiducial markers on a tracked object and fiducial marker projections on the image plane captured by a camera in optical object tracking systems.

BRIEF DESCRIPTION OF DRAWINGS

A system and method realized to fulfill the objective of the present invention is illustrated in the accompanying figures, in which.

Wherein the elements of the present invention and the corresponding reference number are as follows.

100. Method for solving a correspondence problem.
200. Method for selecting LED groups to be used for solving a correspondence problem.
C. Camera
O0. Object elevation (0)
O1. Object elevation (−45)
O2. Object elevation (45)
B0. Bottom LED projection with object elevation of 0 degrees.
B1. Bottom LED projection with object elevation of −45 degrees.
B2. Bottom LED projection with object elevation of 45 degrees.
T0. Top LED projection with object elevation of 0 degrees.
T1. Top LED projection with object elevation of −45 degrees.
T2. Top LED projection with object elevation of 45 degrees.
C0. Center LED projection with object elevation of 0 degrees.
C1. Center LED projection with object elevation of −45 degrees.
C2. Center LED projection with object elevation of 45 degrees.
F0. Flank LED projection with object elevation of 0 degrees.
F1. Flank LED projection with object elevation of −45 degrees.
F2. Flank LED projection with object elevation of 45 degrees.

DETAILED DESCRIPTION OF THE INVENTION

Figure 4:
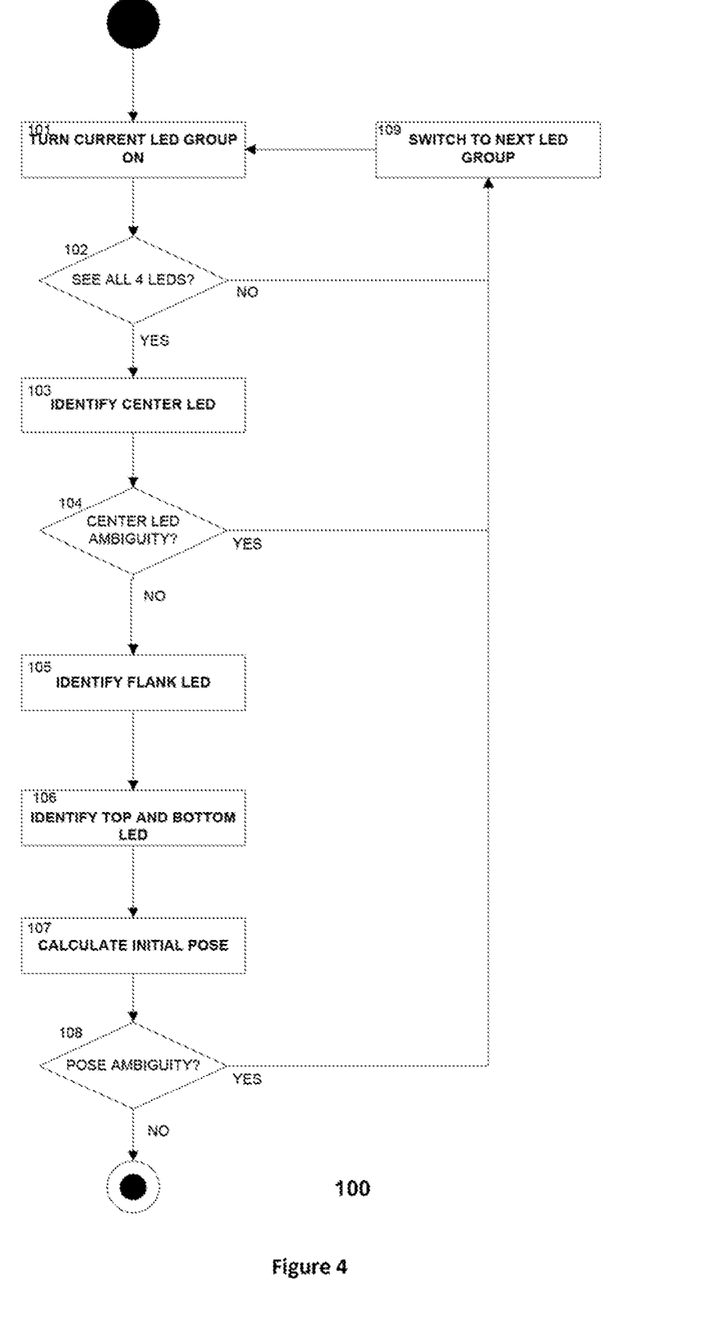
FIG. 4 is the flowchart of the method for solving a correspondence problem.

A method for solving correspondence problem (100) comprises the steps of,
Turning current LED group on (101),
Determining if all 4 LEDs in the current LED group are visible by camera (102),
Identifying center LED if all the LEDs in the current LED group are visible (103),
Determining if the center LED is ambiguous (104),
Identifying flank LED if the center LED is not ambiguous (105),
Identifying the top and bottom LEDs (106), Calculating the pose of tracked object using the calculated correspondences (107),
Determining if the calculated pose is ambiguous (108),
Switching to a new LED group if all the LEDs in the current LED group are not visible or the center LED is ambiguous or the calculated pose is ambiguous (109).

In step 101, we turn on LED in the current LED group so that their projections on 2D space can be seen. Each group preferably does consist of four LEDs selected in a particular pattern on the tracked object. Selection of the four LEDs to be lit stem from two main factors. First, some geometric rules need to be defined to find correspondences and simpler rules can be defined and executed using fewer LEDs. Second, the theoretical minimum number of correspondences necessary to calculate pose of an object is four. Thus, in step 101, as few LEDs as possible are lit while lit LEDs still allow calculation of the pose of the tracked object.

Projections of lit LEDs in 2D space will have an area effect, several pixels will have high intensity values, and thus some form of image processing will need to be applied. This may be in the form of simple thresholding, calculating connected components, calculating center of gravity of close components, etc. These processes are well known in the state of art and will not be discussed here. At the end of this preprocess, we will have four pairs of (x, y) values each one of them correspond to one of the visible LEDs.

In step 102, we determine if all lit LEDs are visible from cameras point of view. It is possible that the tracked object is placed in a pose that blocks the camera's view of one or more LEDs or some LEDS on tracked object are outside of camera view frustum. In such cases, the defined geometric rules won't be applicable. Furthermore, even if correspondence calculation is successful, pose estimation cannot be carried out, as a lesser number of correspondences are known than the theoretical limit of four. In such a case, we can switch out to a new LED set and try again.

Figure 2:
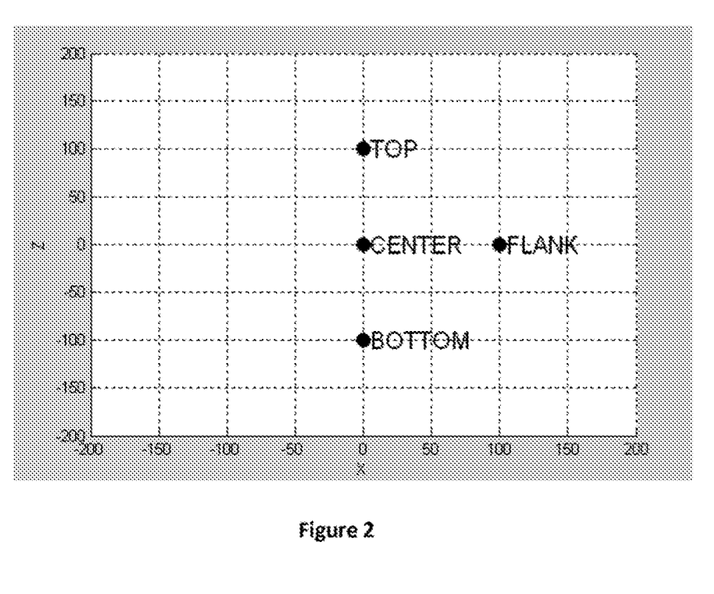
FIG. 2 shows sample placement of a group of four LEDs.

The LEDs in an LED group are placed in a special pattern. A sample pattern can be seen in FIG. 2 where 3 LEDs are placed in a line and the fourth LED is placed in a flank position. Final placement looks much like a 'T'. With this special placement we can create special geometric rules to identify center, flank, top and bottom LEDs.

In step 103, we find the correspondence regarding the center LED. The geometric rule to identify center LED is created with the assumption that center LED has the smallest total distance to other lit LEDs. This is a reasonable assumption since the 3D position of the center LED more or less in the middle of the other LEDs, thus it is safe to assume it will be for 2D projection of LEDs. The distance between two LEDs is calculated on 2D space and as Euclidean distance. Then we identify the center LEDs projection as the one having smallest total distance to the other LEDs.

However, it is not possible to always identify center LED with complete certainty. When two LEDs both have the total smallest distance to the other LEDs, which occurs when LEDs are very close to each other, our confidence of the center LED decision is low. Such cases may happen if the camera is placed in a sideways position relative to the LEDs, then it is possible to confuse center LED with flank LED, or it is possible to confuse center LED with top/bottom LED. In theory, if a 3D to 2D projection is perfect and LEDs are coplanar, we won't need such a confidence metric. However, optic distortion, image processing techniques to produce some error, and LEDs being placed in a non-coplanar fashion make this type of metric necessary. Such cases are named as ambiguous identifications.

In step 104, we determine if the center LED's identification is ambiguous. Such a determination can be achieved via simple relative thresholding (if second smallest total distance is within a predetermined percentage of the smallest total distance we say LED identification is ambiguous). If an ambiguous determination is present, we switch out to a new LED set and try again.

In step 105, the identification of the flank LED takes place. Geometric rules defined to identify flank LED requires us to construct lines from the center LED to other three LEDs in the image. Then for each line we calculate the orthogonal distance of remaining 2 LEDs in the line, thus we calculate 6 (3×2) values in total. The LED corresponding to the smallest value out of calculated six values is identified as one of the top/bottom LEDs. The LED corresponding to the next smallest value of the calculated six values is identified as the other top/bottom LED. Since the center LED and the top/bottom LEDs are identified, the remaining LED becomes the flank LED. At this point it should be noted that two LEDs are identified as the top/bottom LEDs, however there is no one-to-one mapping between the two LEDs in the top and bottom positions.

In step 106, calculation of top and bottom LEDs takes places. The geometric rule defined to identify the top and bottom LEDs requires us to construct a line originating from the flank LED to the center LED. We can then identify the LED on the right side of that line as the top LED and the LED on the left side of the line as the bottom LED (assuming flank LED is selected on the right side, otherwise we can switch the bottom LED with the top LED). It should be noted that special placement of the LEDs does not allow confusion on correspondence calculations aside from center LED ambiguity, thus explained method presents a robust way of calculating correspondences.

Figure 3:
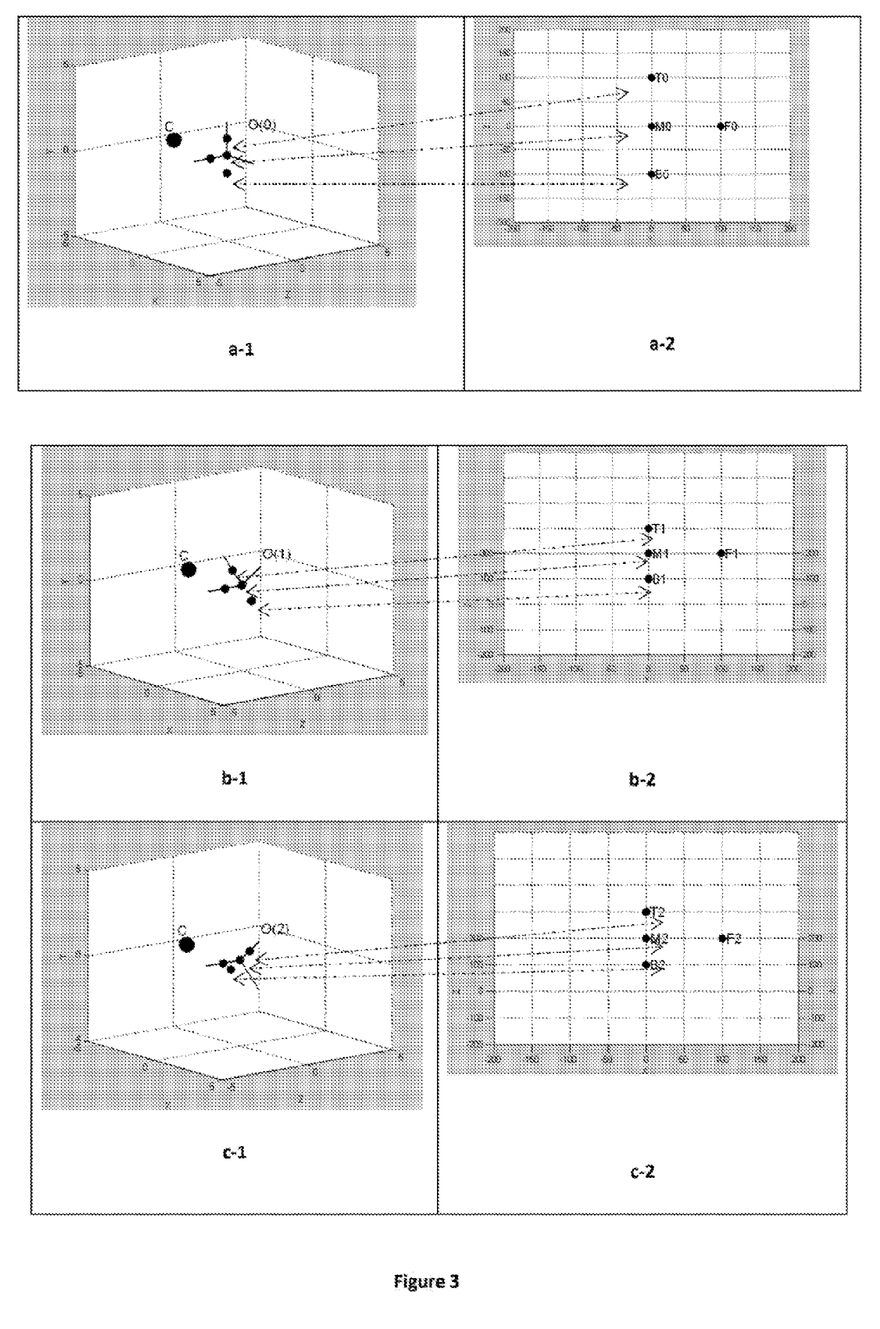
FIG. 3 shows an example of a pose ambiguity problem, and a-1 and a-2 show an example of an LED group projection with object elevation of 0 degrees; b-1 and b-2 show an example of an LED group projection with object elevation of −45 degrees; c-1 and c-2 show an example of an LED group projection with object elevation of +45 degrees.

In step 107, calculation of pose using the calculated four correspondences takes place. It is possible to calculate the pose using four correspondences. However, for some cases there is no one-to-one mapping between 2D view of LEDs and pose (i.e. from a particular 2D view of LEDs it is possible to calculate 2 poses both of which are correct). This case is called pose ambiguity and it is an inherit problem of pose estimation. An instance of a pose ambiguity problem is illustrated in FIG. 3. In FIG. 3 graphs on the left side show position of a LED group in 3D space and graphs on the right side shows their projection on 2D space. a-1 and a-2 of FIG. 3 are the normal projection without any rotation on LEDs to take reference from. In b-1 and b-2 of FIG. 3 LEDs are rotated −45 degrees in elevation axis and in c-1 and c-2 of FIG. 3 LEDs are rotated +45 degrees in elevation axis. As can be seen from the figures, resulting images are identical, thus found pose of EL=45 degrees and EL=−45 degrees are both mathematically correct. However, in reality only one of these poses causes resulting image, but there is no way to find the correct pose using pose estimation methods. To be complete, we should note that, graphs on the right side of FIG. 3 are obtained after preprocessing of captured images (to find single (x, y) values for each LED). In raw captured images, the top LED would be larger than the bottom LED in b-1 and b-2 of FIG. 3 since it is closer to the camera, and the bottom LED would be larger than the top LED in c-1 and c-2 of FIG. 3 since it is closer to the camera. We also should note that the problem is not bound to a single axis, but it is present when poses that correspond to a single 2D view are symmetrical.

In step 108, we determine if the pose calculation is ambiguous. If it is not, calculated correspondences are correct and they can be used to calculate pose. We can start the normal iteration of pose estimation and correspondence calculation. However, if the pose is ambiguous, even though calculation of correspondences is correct, they cannot be used in the pose estimation process. Thus, calculated correspondences are not sufficient to start the normal iteration of pose estimation and correspondence calculation. In such a case, we switch out to a new LED set and try again.

Figure 5:
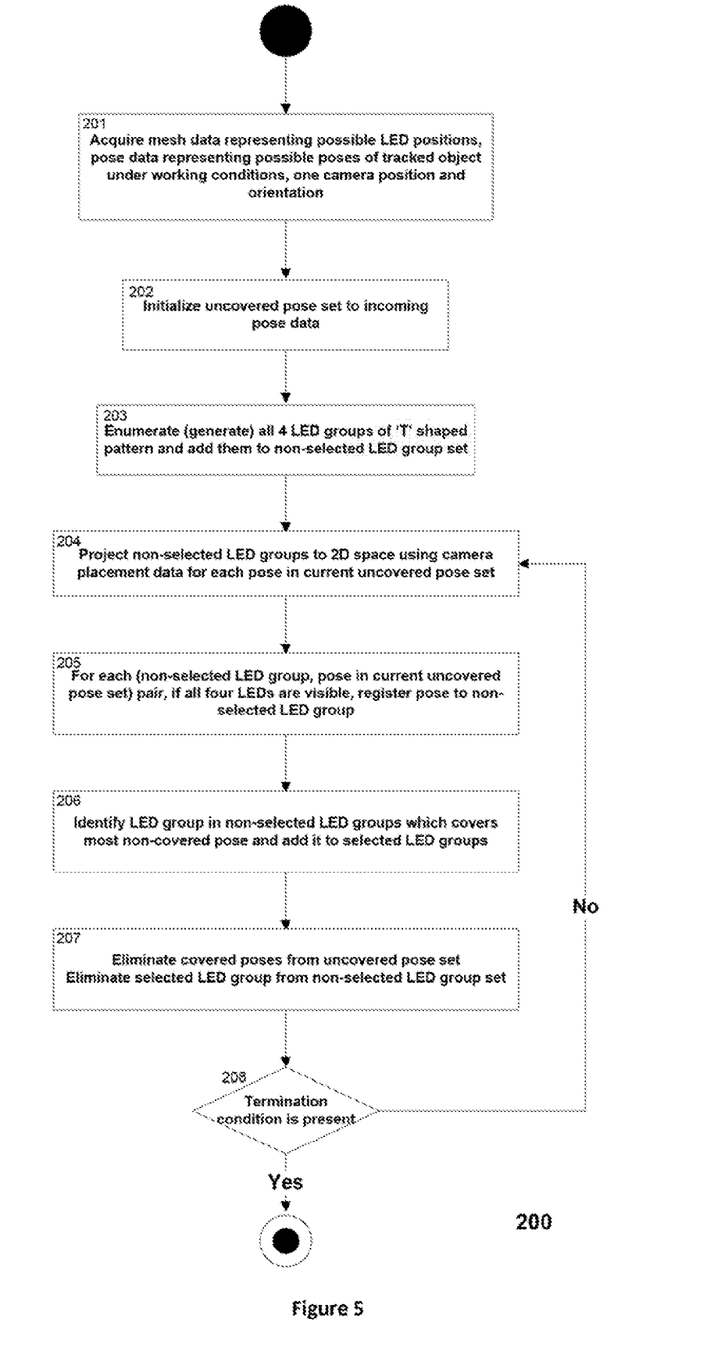
FIG. 5 is the flowchart of the method for selecting LED groups to be used for solving correspondence problem.

If method for solving correspondence problem (100) is executed using only a group of four LEDs, there would be cases where correspondences could not be calculated or the pose of an object cannot be found because of pose ambiguity. To avoid such cases, we propose to use several LED groups. However, LED groups should be selected mindfully so that a minimal number of LED groups should be selected while covering all of the possible poses that object can take. The method for selecting LED groups (200) to be used for solving correspondence problem (100) specifies such a mindful selection process which uses poses of a tracked object under working conditions for better LED group selection that suits use case in better fashion.

A method for selecting LED groups (200) to be used for solving correspondence problem (100) comprises the steps of,
acquiring mesh data representing active marker positions; pose data representing possible poses of a tracked object under working conditions; and one camera position and orientation (201),
Initializing uncovered pose set to acquired pose data (202),
Enumerating (generating) all 4 LED groups of 'T' shaped pattern and add them to non-selected LED group set (203),
Projecting non-selected LED groups to 2D space using camera placement data for each pose in current uncovered pose set (204),
Registering pose to non-selected LED group, if all four LEDs are visible, for each (non-selected LED group, pose in current uncovered pose set) pair (205),
Identifying LED group in non-selected LED groups which covers most non-covered pose and add it to selected LED groups (206),
Eliminating covered poses from uncovered pose set and eliminating selected LED group from non-selected LED group set (207),
Determining if any termination condition is satisfied and terminating if so (208).

Figure 1:
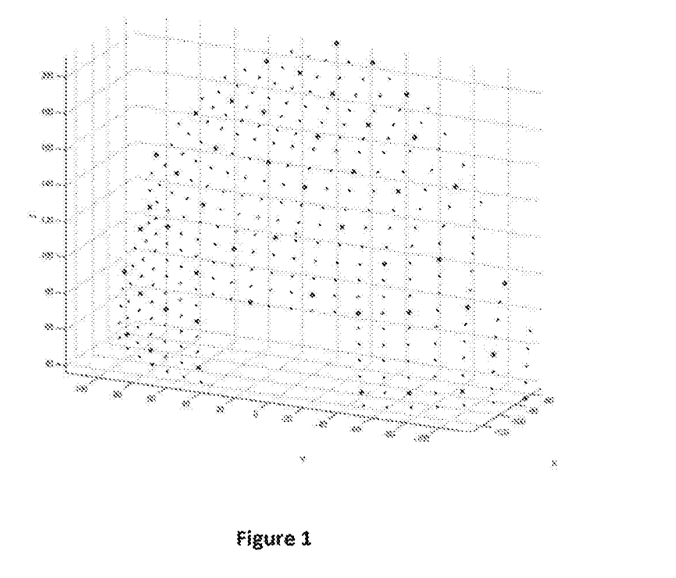
FIG. 1 shows graph of a mesh of possible fiducial positions on the object.

Positions of active fiducials on the tracked object (say a helmet for a head tracking system with infrared LEDs) are represented on each position of the object with a three dimensional coordinate. It is important to note that these coordinates on the mesh (model) are determined with respect to a common coordinate system and should be relatable to the camera location. At the same time pose data representing possible poses of a tracked object under working conditions should also be introduced. In a preferred configuration of the present invention, these data are acquired using inertial measurement units (IMU) placed on the real object under real working conditions and movements of the objects are recorded to be used as pose data.

In step 202, initialization of an uncovered pose set takes place. An uncovered pose set is the set of currently uncovered poses, where uncovered means none of the currently selected groups of LEDs can be seen fully using the pose. This set is initially the whole input pose data. However, this set will be reduced to an empty set as more poses gets covered as the method progresses.

In step 203, enumeration (generation) of all LED groups with a 'T' shaped pattern takes place. This step is overly dependent on the positions of active fiducials on the tracked object. However, generation of LED groups is somewhat straightforward. A simple example can be given using n×n grid of LEDs. If we use 3×3 grid of LEDs on the n×n grid, middle LED in the 3×3 grid can be used in 8 LED groups where middle LED is the center LED in 'T' pattern (we can construct 4 straight lines of size 3 in 3×3 grid in shapes of '+' and 'x', and it is possible to place flank LED on the right side or left). Similar strategies can be found for the specific input on active fiducial positions; however, any generation process should be expected to result in reasonably small number of LED groups. Knowing the relative spatial positions of a tracked object and camera, it is possible to translate and rotate the LED groups mathematically using the input pose data, and visibilities of fiducials can be calculated.

In the step 204, visibility of each non-selected LED group on the mesh from input camera position/orientation for every pose in an uncovered pose set is calculated; also in step 205, a visibility value list is generated representing every non-selected LED group. Visibility value represents how many times all the nodes in a LED group were visible from the camera viewport, considering the current uncovered pose set.

In a preferred configuration, an occlusion model is used to estimate the visibility of 3D model points (active markers) given the pose. It is based on a ray tracing technique developed in computer graphics. In the case of LED fiducials, the visibility computation is based on the LED's normal position with respect to the object coordinate system, LEDs illumination cone angle and the known pose of the object. The angle between the LED's normal position and camera plane normal position in camera coordinate system defines how perpendicular the LED is directed towards the camera (LED direction angle). The LED's illumination cone angle defines a minimum LED direction angle threshold for the LED to be visible for the camera. For a given pose, the LED direction angle can be computed for each LED to determine its visibility. The marker's normal position with respect to the object coordinate system, marker's illumination cone angle and the known pose of the object can be equivalently applied to any active marker tracking system.

In step 206, the non-selected LED group with the highest visibility count is selected to be used in the method for solving a correspondence problem (100). The LED group with the highest visibility count, which was not determined as an LED group to be used in the method for solving a correspondence problem (100) previously, is selected since it is fully visible for most of the determined pose data.

In step 207, we eliminate poses covered by the recently selected LED group from uncovered pose set and delete the recently selected LED group from non-selected LED group set that is used for further calculations. In this configuration, the number of elements in the uncovered pose set is decreasing in each iteration since at least one pose is covered by newly the selected LED group. Also, in this configuration, the number of selected LED groups increases by one in each iteration.

In step 208, the termination condition is checked. The main termination condition occurs when every pose in the initial pose data is covered by at least one selected LED group. This case corresponds to a successful trained selection of LED groups with respect to input pose data. In some exceptional cases, where input pose data, camera position, and active marker positions do not allow coverage of all poses. In this case, it is possible to terminate if the method fails to cover at least one pose with the addition of a new LED group. In this case, LED groups produced by the method for selecting the LED groups to be used for solving correspondence problem (200) won't be able to produce valid correspondence results when used in the method for solving correspondence problem (100) for every pose in the training set. A different termination condition can be specified for selection of a predetermined number of LED groups. In this configuration, some poses won't be covered however the method for solving correspondence problem (100) will have fewer LED groups to work with.

The invention claimed is:

1. A method for solving correspondence problem (100) characterized by the steps of;
   Turning current LED group on (101),
   Determining if all 4 LEDs in the current LED group are visible (102) by camera,
   Identifying center LED if all the LEDs in the current LED group is visible (103),
   Determining if the center LED is ambiguous (104),
   Identifying flank LED if the center LED is not ambiguous (105),
   Identifying top and bottom LEDs (106),
   Calculating the pose of tracked object using the calculated correspondences (107),
   Determining if the calculated pose is ambiguous (108),
   Switching to a new LED group if all the LEDs in the current LED group are not visible or the center LED is ambiguous or the calculated pose is ambiguous (109).

2. A method for solving correspondence problem (100) as in claim 1, characterized in that using four lit LEDs at a time specially placed in a T shaped pattern in Step 101.

3. A method for solving correspondence problem (100) as in claim 2, characterized in that solving correspondence problem is carried out only if four LEDs are all visible by the camera.

4. A method for solving correspondence problem (100) as in claim 1, characterized in that identifying the correspondence regarding center LED is achieved by calculating the distance of all LEDs to other remaining three LEDs and selecting the smallest total distance as the center LED to be associated with the middle LED in 3D space in Step 103.

5. A method for solving correspondence problem (100) as in claim 4, characterized in that identifying found correspondence regarding center LED as ambiguous and discarding the center LED to be used further if two smallest total distance calculated are within predetermined percentage of each other.

6. A method for solving correspondence problem (100) as in claim 1, characterized in that identifying the correspondence regarding flank LED in Step 105, is achieved by constructing three lines from center LED to the remaining LEDs, then calculating orthogonal distances to each line from the remaining two LEDs, then finding smallest orthogonal distance to any line, and finally selecting the one LED as flank which is not used in construction of the line that has smallest orthogonal distance or has not smallest orthogonal distance to a line.

7. A method for solving correspondence problem (100) as in claim 1, characterized in that identifying the correspondences regarding top/bottom LEDs in Step 106, is achieved by constructing a line from flank LED to the center LED, and identifying the LED on the right side of the line as top LED and left side of the line as bottom LED.

8. A method for solving correspondence problem (100) as in claim 7, characterized in that top/bottom LED correspondences are switched if flank LED is on the left side of the LED group.

9. A method for solving correspondence problem (100) as in claim 1, characterized in that correspondences calculated are used by any pose estimation algorithm and found pose is said to be ambiguous if there are more than one correct pose for the correspondence at hand in step 108.

10. A method for solving correspondence problem (100) as in claim 1, characterized in that execution switch LED group for a new one if there is pose ambiguity, center LED ambiguity or less than four LEDs are visible through camera.

11. A method for selecting a plurality of light emitting diode (LED) groups to be used for solving correspondence problem, comprising the steps of:
   acquiring a mesh data representing active marker positions, a pose data representing possible poses of a tracked object under working conditions, and a camera position and orientation; further comprising the steps of:
   initializing an uncovered pose set to an acquired pose data,
   deriving four LED groups of a 'T' shaped pattern from a mesh of possible LED positions and adding the four LED groups to a non-selected LED group set,
   projecting the non-selected LED group set to a 2D space using the camera position and orientation for each pose in a current uncovered pose set,
   registering a pose to the non-selected LED group set, if all the four LED groups are visible according to a visibility computation which is based on the LED's normal position with respect to an object coordinate system, LEDs illumination cone angle and the known pose of the object, for each pair,
   identifying an LED group from a non-selected LED group which covers a most non-covered pose and adding it to a plurality of selected LED groups,
   eliminating a plurality of covered poses from the uncovered pose set and eliminating the selected LED group from the non-selected LED group set,
   determining if a termination condition is satisfied and terminating if the termination condition is satisfied.

12. The method for selecting the LED groups of claim 11, wherein the uncovered pose set is a plurality of uncovered poses by the selected LED groups and initialized to pose data representing possible poses of the tracked object under working conditions at start of an execution.

13. The method for selecting LED groups of claim 11, wherein all 'T' shaped LED groups of the four LED groups are enumerated as a plurality of candidate LED groups.

14. The method for selecting LED groups of claim 11, wherein the non-selected LED groups are projected using the camera position and orientation for each pose in a current remaining uncovered pose set.

15. The method for selecting LED groups of claim 11, wherein termination of the method happens when the uncovered pose set becomes empty, a predetermined number of LED groups are selected, or any LED group fails to cover at least one uncovered pose.

* * * * *